United States Patent
Takeishi et al.

(10) Patent No.: US 6,186,740 B1
(45) Date of Patent: Feb. 13, 2001

(54) GAS TURBINE COOLING BLADE

(75) Inventors: Kenichiro Takeishi; Kiyoshi Suenaga; Kazuo Uematsu, all of Hyogo-ken (JP)

(73) Assignee: Mitsubishi Heavy Industries, Ltd., Tokyo (JP)

(*) Notice: Under 35 U.S.C. 154(b), the term of this patent shall be extended for 0 days.

(21) Appl. No.: 09/035,217

(22) Filed: Mar. 5, 1998

(51) Int. Cl.⁷ .................................................. F01D 5/18
(52) U.S. Cl. ...................................... 416/96 A; 416/97 R
(58) Field of Search .................. 415/115; 416/96 A, 416/96 R, 97 R

(56) References Cited

U.S. PATENT DOCUMENTS

| | | | |
|---|---|---|---|
| 3,574,481 | * 4/1971 | Pyne, Jr. | 416/90 |
| 3,628,885 | * 12/1971 | Sidenstick et al. | 416/95 |
| 4,021,139 | * 5/1977 | Franklin | 416/97 R |
| 4,297,077 | * 10/1981 | Durgin et al. | 416/97 R |
| 4,461,612 | * 7/1984 | Dodd | 416/96 A |
| 4,616,976 | * 10/1986 | Lings et al. | 416/97 R |
| 5,120,192 | * 6/1992 | Ohtomo et al. | 415/115 |
| 5,762,471 | * 6/1998 | Cunha | 415/115 |

* cited by examiner

Primary Examiner—F. Daniel Lopez
Assistant Examiner—Ninh Nguyen
(74) Attorney, Agent, or Firm—John P. White; Cooper & Dunham LLP

(57) ABSTRACT

In a gas turbine cooling blade, cooling passages are defined by ribs formed therein. The cooling blade comprises an insert fitted in one of the cooling passages at the front edge of the blade, a plurality of nozzles formed in the front face of the insert and used to spray an impact jet of a refrigerant against the inner surface of the front edge of the blade, thereby cooling the inner surface, and a passage formed between the rear face of the insert and the rib and communicating with a rear-side flow.

7 Claims, 3 Drawing Sheets

GAS TURBINE COOLING BLADE

BACKGROUND OF THE INVENTION

The present invention relates to a cooling blade of a gas turbine.

Waste heat from a high-temperature gas turbine is recovered and utilized for a boiler of a steam turbine in some combined plants.

In one such combined plant, a cooling blade of the high-temperature gas turbine is cooled by internal cooling only. A refrigerant, having absorbed heat from the gas turbine by cooling it, is entirely recovered outside the gas turbine, and is fed into the steam turbine. By doing this, the performance of the whole plant is improved.

The cooling blade of the gas turbine has a recovery-type cooling structure. Thus, pneumatic power loss attributable to film-cooling that is applied to the high-temperature gas turbine can be reduced, and the turbine efficiency of the gas turbine can be improved.

Referring now to FIGS. 1A and 1B, a conventional turbine blade of the recovery type will be described. In the description to follow, a stationary blade is given as an example of the gas turbine cooling blade. FIG. 1A is a vertical sectional view of the cooling blade, and FIG. 1B is a sectional view taken along line A—A of FIG. 1A.

A cooling blade 1 is supplied with a refrigerant 6 from a waste heat boiler or the like outside a casing (not shown) through supply pipes 4 that penetrate an outer shroud 3. The refrigerant 6 fed into the blade 1 absorbs heat as it flows through a cooling passage 2 defined by a rib 7 toward a rear-side flow. The refrigerant 6, having thus absorbed heat, is guided through a recovery pipe to the outside of the gas turbine system. Thereafter, the refrigerant is delivered to a steam turbine in a combined plant, whereupon heat is recovered from it.

FIG. 2A shows a heat transfer rate distribution on the outer surface of the conventional turbine blade described above. Referring to FIG. 2A, a reference point O is settled on a front edge 8 (FIG. 1B) of the blade, and various points are settled on the outside and inside of the blade, corresponding individually to the ratios between X-direction distances from the reference point O, along the outside and inside of the blade, and a distance $X_{max}$ from the point O to the rear end edge of the blade. The curve of FIG. 2A represent a series heat transfer rates obtained at the individual points.

As seen from FIG. 2A, the heat transfer rate of the front edge 8 is relatively high, and the heat transfer area is narrower on the cooling side than on the gas side. Thus, the front edge 8 of the blade can be regarded as one of the most reluctant parts to be cooled.

Generally, in a cooling blade of this type, the refrigerant 6 is run through the cooling passage 2 therein, so that the passage 2 can be cooled at an average heat transfer rate throughout the area. Actually, however, high-temperature portions are formed in the cooling blade, as mentioned before. This implies that high-temperature portions will inevitably develop in part of the cooling blade if only the front edge of the blade, which displays relatively high heat transfer rates outside, is intensively cooled with use of a conventional serpentine passage.

BRIEF SUMMARY OF THE INVENTION

The object of the present invention is to provide a long-life turbine cooling blade with a uniform metal temperature.

In order to achieve the above object, a gas turbine cooling blade according to the present invention comprises an insert fitted in a cooling passage at the front edge of the turbine blade, a plurality of nozzles formed in the front face of the insert and used to spray an impact jet of a refrigerant against the inner surface of the front edge of the blade, thereby cooling the inner surface, and a passage formed between the rear face of the insert and a rib on the inner surface of the blade and communicating with a rear-side flow.

In this arrangement, the refrigerant is ejected from the nozzles in the insert and runs against the inner surface of the turbine blade, thereby cooling the front edge portion of the blade from inside. Then, the refrigerant, run against the inner surface of the turbine blade, flows through a gap between the insert and the inner surface of the turbine blade, thereby effecting the so-called convection cooling. After flowing through the gap, the refrigerant finally flows through the passage defined by the rear face of the insert and the rib on the inner surface of the blade. Then, the refrigerant flows into the next cooling passage and gradually recovers heat energy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B show an arrangement of a conventional turbine cooling blade, in which FIG. 1A is a vertical sectional view, and FIG. 1B is a sectional view taken along line A—A of FIG. 1A;

FIGS. 2A and 2B show heat distributions of the cooling blade, in which FIG. 2A is a conceptual diagram illustrating a heat transfer rate distribution on the outer surface of the blade, and FIG. 2B is a graph illustrating the difference between the prior art and the invention regarding the metal temperature distribution on the outer surface of the blade;

FIGS. 3A and 3B show an arrangement of a turbine cooling blade according to an embodiment of the present invention, in which FIG. 3A is a vertical sectional view, and FIG. 3B is a sectional view taken along line A—A of FIG. 3A.

DETAILED DESCRIPTION OF THE INVENTION

Figure 3A:
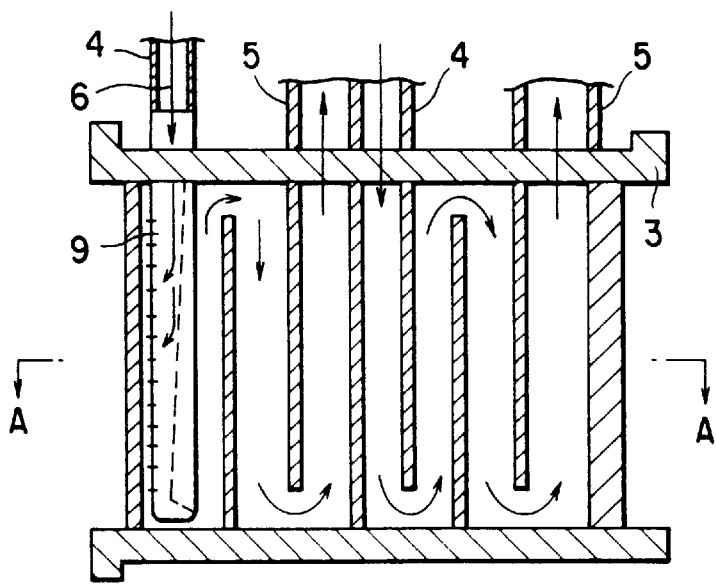
Figure 3B:
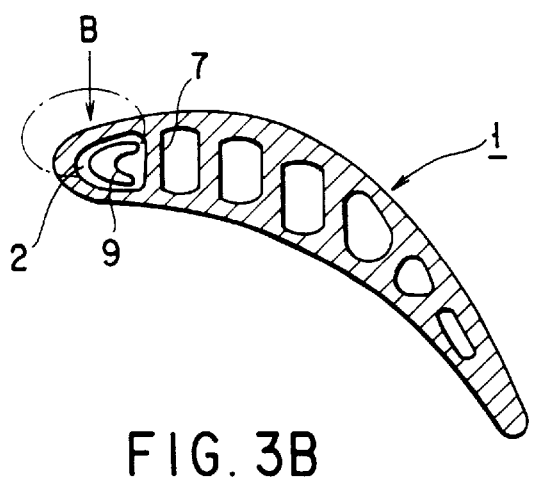
Figure 4:
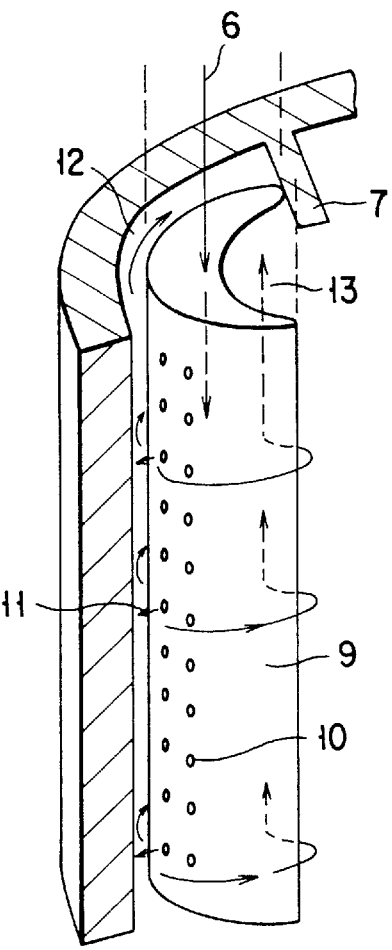
FIG. 4 is an enlarged view showing a section B of FIG. 3B.

An embodiment of the present invention will now be described with reference to the accompanying drawings of FIGS. 3 and 4. FIG. 3A is a vertical sectional view of a cooling blade, FIG. 3B is a sectional view taken along line A—A of FIG. 3A, and FIG. 4 is an enlarged view showing a section B of FIG. 3B. In the foregone description of the prior art and the description to follow, like reference numerals are used to designate like portions throughout the drawings for simplicity of illustration.

According to the present embodiment, an insert 9 is fitted in a cooling passage 2, whereby the inner wall of the front edge portion of a blade 1 is cooled. Substantially crescent-shaped, the insert 9 is supplied with a refrigerant 6 inside. The inner surface of the front edge of the blade 1 is cooled by means of an impact jet 11 run through a plurality of nozzles 10 that are opposed to the front edge portion of the blade.

After impacting against the inner surface of the front edge of the blade, the refrigerant 6 flows through a gap 12 between the insert 9 and the inner surface of the front edge, thereby effecting the so-called convection cooling. While doing this, the refrigerant 6 gets into a hollow of the substantially crescent-shaped insert 9, and joins a passage 13 that is defined by the recess and a rib 7. Then, the refrigerant 6 flows into a cooling passage in the next stage, and cools a gas turbine as it is discharged from the turbine through recovery pipes.

Preferably, the internal passage of the insert 9 is tapered along the flow of the refrigerant (as indicated by the broken line in FIG. 3A) so that the flow rate of the refrigerant in the insert is constant, and the rate of flow in the passage 13 is also fixed.

In the present embodiment, the refrigerant 6 is ejected through the nozzles 10 of the insert 9 and runs against the inner surface of the turbine blade, thereby cooling it. The effect of this cooling operation can be controlled in accordance with the flow rate of the impacting refrigerant and the arrangement of the nozzles 10.

After running against the inner surface of the turbine blade, the refrigerant 6 flows through the gap 12 between the insert 9 and the blade inner surface, thereby effecting the so-called convection cooling. The effect of this cooling operation can be controlled by adjusting the gap 12.

After flowing through the gap 12, the refrigerant 6 flows through the passage 13 defined by the recess in the rear face of the insert 9 and the rib 7 of the turbine blade, and then flows into the next cooling passage at a refrigerant supply end.

Figure 1A:
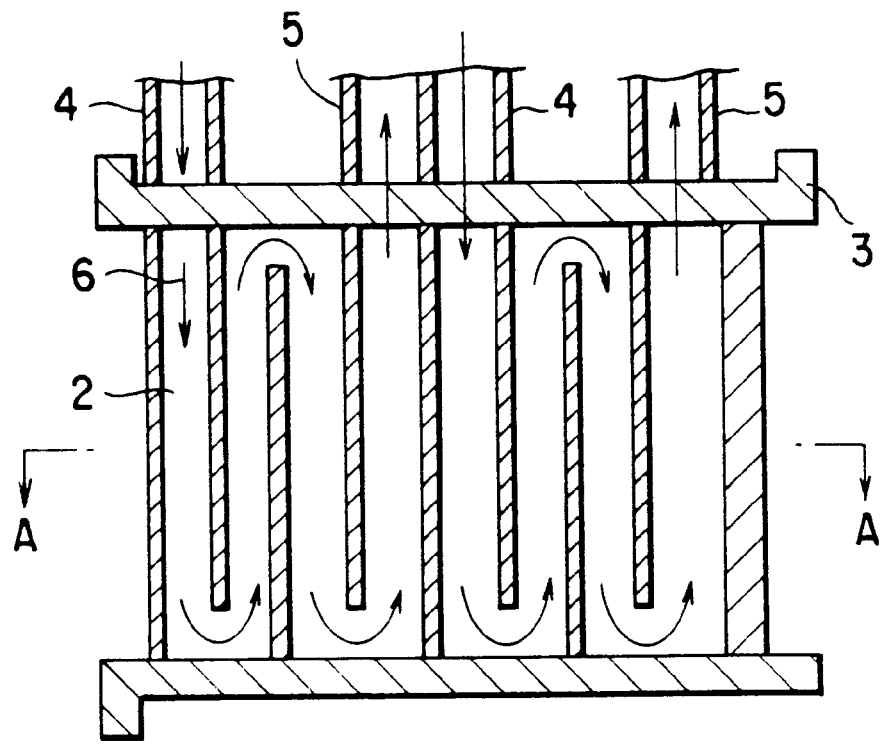
Figure 1B:
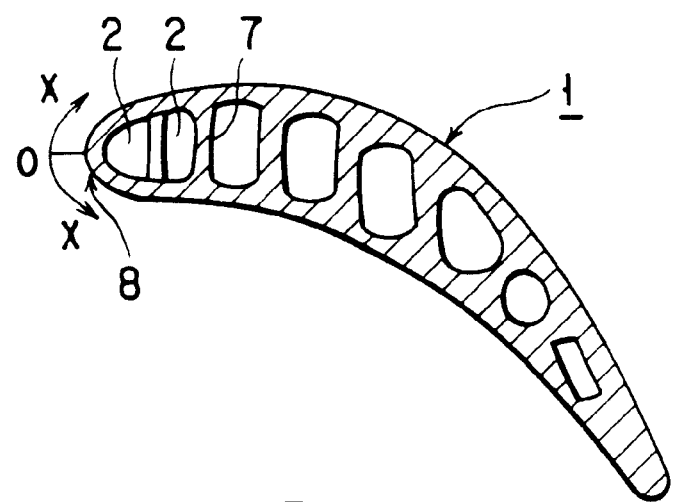
Figure 2A:
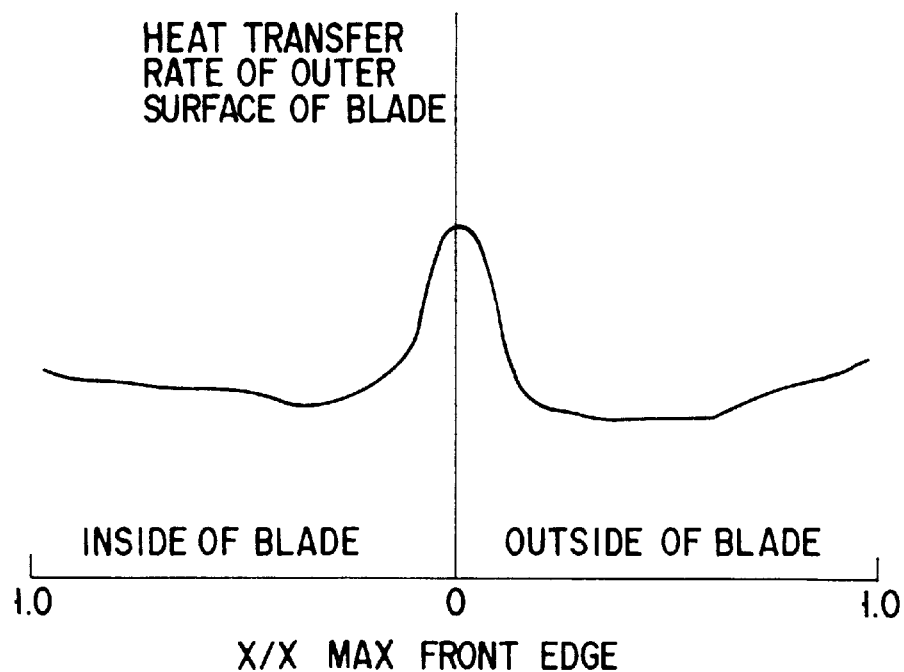
Figure 2B:
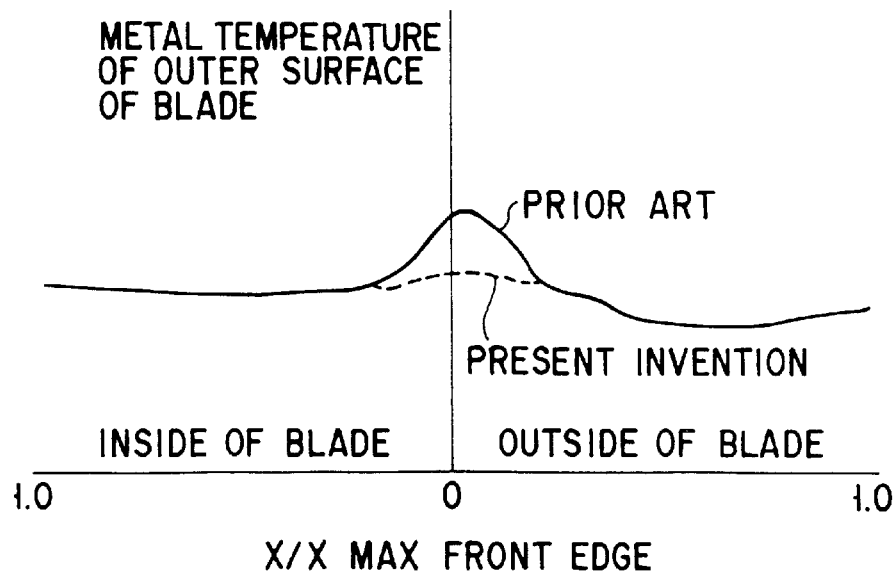

Thus, according to the present embodiment, the front edge of the blade is cooled from inside by means of the refrigerant in the form of an impact jet. By doing this, the outer surface metal temperature of the blade can be made uniform throughout the area from the front edge of the blade to the rear edge, as shown in FIG. 2B for comparison with the conventional case, so that the life performance of the blade can be improved considerably.

Although a stationary blade is given as an example of the gas turbine cooling blade according to the embodiment described above, the invention may be also applied to any other blade, such as a moving blade.

According to the present invention, as described herein, the front edge of the turbine blade is cooled from inside by means of the impact jet, and the effect of this cooling operation is controlled in accordance with the rate of heat transfer outside the blade. Therefore, the blade metal temperature can be made uniform throughout the area from the front edge of the blade to the rear edge, and the passage defined between the rear face of the insert and the rib of the turbine blade can be used as a return pass for the refrigerant. Thus, there may be provided a long-life cooling blade in which a passage for the recovery of the refrigerant can be formed so that the heat energy of the gas turbine can be recovered effectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gas turbine cooling blade comprising:
   a plurality of ribs defining a plurality of convection regions which are divided in a chord direction, the plurality of convection regions being designed to make a refrigerant jetted in the blade returns from a blade end and a blade root, and convect the refrigerant in the chord direction; and
   an insert inserted in a first convection region of the plurality of convection regions which is located on a front edge side of the blade, the insert having a plurality of nozzles formed therein, the insert being designed to jet the refrigerant onto a surface of the front edge side of the blade,
   wherein the refrigerant jetted out from the insert flows from a first passage in the first convection region, which is defined by the surface of the front edge side of the blade and a front edge of the insert, to a second passage in the first convection region, which is defined by a surface of a rear edge side of the blade and that rib of the plurality of ribs which defines the first convection region, and then all of the refrigerant flows through those convection regions of the plurality of convection regions which are subsequent to the first convection region, and in which no inserts are inserted.

2. The gas turbine cooling blade according to claim 1, wherein the insert is tapered along a flow of the refrigerant so that the flow rate of the refrigerant is constant.

3. The gas turbine cooling blade according to claim 1, wherein the insert has a lunette shape and is formed along the inner surface of the front edge of the blade.

4. A gas turbine cooling blade comprising:
   a plurality of ribs defining a plurality of convection regions which are divided in a chord direction, the plurality of convection regions being designed to make a refrigerant jetted in the blade returns from a blade end and a blade root, and convect the refrigerant in the chord direction; and
   an insert inserted in a first convection region of the plurality of convection regions which is located on a front edge side of the blade, the insert including a portion which has a plurality of nozzles and are allowed to jet the refrigerant onto portions of a front edge of the blade in such manner that a temperature of an outer periphery of the blade becomes uniform, when the refrigerant is jetted onto the portions of the front edge of the blade,
   wherein the refrigerant jetted out from the insert flows from a first passage in the first convection region, which is defined by a surface of the front edge side of the blade and a front edge of the insert, to a second passage in the first convection region, which is defined by a surface of a rear edge side of the insert and that rib of the plurality of ribs which defines the first convection region, and then all of the refrigerant flow through those convection regions of the plurality of convection regions which are subsequent to the first convection region, and in which no inserts are inserted.

5. The gas turbine cooling blade according to claim 4, wherein the insert is tapered along a flow of the refrigerant so that the flow rate of the refrigerant is constant.

6. The gas turbine cooling blade according to claim 4, wherein the insert has a lunette shape and is formed along the inner surface of the front edge of the blade.

7. A gas turbine cooling blade comprising:
- a plurality of ribs defining a plurality of convection regions which are divided in a chord direction, the plurality of convection regions being designed to make a refrigerant jetted in the blade returns from a blade end and a blade root, and convect the refrigerant in the chord direction; and
- an insert inserted in a first convection region of the plurality of convection regions which is located on a front edge side of the blade, the insert having a plurality of nozzles formed therein, the insert being designed to jet the refrigerant onto a surface of the front edge side of the blade, the insert being tapered in a flowing direction of the refrigerant, whereby a flow rate of the refrigerant is constant after the refrigerant is jetted out from the nozzles, wherein the refrigerant jetted out from the insert flows from a first passage in the first convection region, which is defined by the surface of the front edge side of the blade and a front edge of the insert, to a second passage in the first convection region, which is defined by a surface of a rear edge side of the insert and that rib of the plurality of ribs which defines the first convection region, and then all of the refrigerant flow through those convection regions of the plurality of convection regions which are subsequent to the first convection region, and in which no inserts are inserted.

* * * * *